US011181326B2

(12) United States Patent
Ma et al.

(10) Patent No.: US 11,181,326 B2
(45) Date of Patent: Nov. 23, 2021

(54) PARTICLE-BASED THERMAL ENERGY STORAGE SYSTEMS

(71) Applicant: Alliance for Sustainable Energy, LLC, Golden, CO (US)

(72) Inventors: Zhiwen Ma, Golden, CO (US); Patrick Gordon Davenport, Boulder, CO (US); Janna Martinek, Lafayette, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 72 days.

(21) Appl. No.: 16/580,421

(22) Filed: Sep. 24, 2019

(65) Prior Publication Data

US 2020/0124356 A1    Apr. 23, 2020

Related U.S. Application Data

(60) Provisional application No. 62/735,455, filed on Sep. 24, 2018, provisional application No. 62/850,927, filed on May 21, 2019.

(51) Int. Cl.
  *F28D 17/00* (2006.01)
  *F23L 15/02* (2006.01)
  *F28D 20/00* (2006.01)

(52) U.S. Cl.
  CPC ....... *F28D 20/0043* (2013.01); *F28D 17/005* (2013.01); *F28D 20/0056* (2013.01); *F28D 2020/0078* (2013.01); *F28D 2020/0082* (2013.01)

(58) Field of Classification Search
  CPC .............. F28D 20/0043; F28D 17/005; F28D 20/0056; F28D 2020/0078; F28D 2020/0082
  USPC ........................................................... 165/4
  See application file for complete search history.

(56) References Cited

U.S. PATENT DOCUMENTS

| | | | |
|---|---|---|---|
| 3,922,797 A * | 12/1975 | Dick | F27D 15/0213 34/432 |
| 10,233,787 B2 | 3/2019 | Larochelle et al. | |
| 10,233,833 B2 | 3/2019 | Apte et al. | |
| 10,288,357 B2 | 5/2019 | Laughlin et al. | |
| 2008/0134681 A1 | 6/2008 | Nayef et al. | |
| 2011/0038711 A1* | 2/2011 | Cortes | F01D 19/00 415/116 |
| 2012/0080168 A1 | 4/2012 | Hemrle et al. | |
| 2014/0352304 A1 | 12/2014 | Arias et al. | |

FOREIGN PATENT DOCUMENTS

CN    105888996 A    2/2019

OTHER PUBLICATIONS

Benato et al., "Pumped Thermal Electricity Storage: A technology overview", Thermal Science and Engineering Progress, Jun. 2018, vol. 6, pp. 301-315.

(Continued)

*Primary Examiner* — Davis D Hwu
(74) *Attorney, Agent, or Firm* — Alexandra M. Hall

(57) ABSTRACT

Methods and devices for long-duration electricity storage using low-cost thermal energy storage and high-efficiency power cycle, are disclosed. In some embodiments it has the potential for superior long-duration, low-cost energy storage.

5 Claims, 12 Drawing Sheets

(56) References Cited

OTHER PUBLICATIONS

Calderón et al., "High temperature systems using solid particles as TES and HTF material: A review", Applied Energy, 2018, vol. 213, pp. 100-111.
Farsi et al., "Thermodynamic assessment of a hybrid particle-based concentrated solar power plant using fluidized bed heater exchanger", Solar Energy, 2019, vol. 179, pp. 236-248.
Ma et al., "The Thermal Energy Storage Solution", American Solar Energy Society, May 12, 2012, accessed Dec. 19, 2019 https://www.ases.org/the-thermal-energy-storage-solution/, pp. 1-4.
Ma et al., "Development of a concentrating solar power system using fluidized-bed technology for thermal energy conversion and solid particles for thermal energy storage", Energy Procedia, International Conference on Concentrating Solar Power and Chemical Energy Systems, SolarPACES 2014, 2015, vol. 69, pp. 1349-1359.
Ma et al., "Design of Particle-based Thermal Energy Storage for a Concentrating Solar Power System", ASME Power and Energy, Proceedings of the ASME 2017 11th International Conference on Energy Sustainability, Jun. 26-30, 2017, pp. 1-8.
International Search Report and Written Opinion for International (PCT) Application No. PCT/US19/52612, dated Dec. 16, 2019, pp. 1-7.

\* cited by examiner

PARTICLE-BASED THERMAL ENERGY STORAGE SYSTEMS

CROSS-REFERENCE TO RELATED APPLICATIONS

This application claims the benefit of U.S. Provisional Patent Application 62/735,455 filed on Sep. 24, 2018 and U.S. Provisional Patent Application 62/850,927 filed on May 21, 2019, the contents of which are incorporated by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Renewable energy resources have been limited by the ability to store energy produced during off-peak times for use during non-peak times. Energy storage is important for variable-regeneration renewable energy sources, such as wind and solar. However, current battery technologies are too expensive for grid-scale, long duration energy storage. Molten salt storage is expensive and limited by salt stability and corrosion issues. Pumped energy storage in the form of hydroelectricity is limited by the geological conditions of the system as it requires two reservoirs at different vertical levels. Thus, there remains a need for improved energy storage systems, capable of storing excess electricity produce by alternative energy sources such as wind and solar, to be recovered later during peak electricity demand.

SUMMARY

An aspect of the present disclosure is a method that includes, in order, a first storing of a first heat transfer medium that includes a first plurality of solid particles at a first temperature between 250 and 500° C., a first transferring of energy to the first heat transfer medium, resulting in at least a portion of the first heat transfer medium being heated to a second temperature between 850 and 1300 C, a second storing of the heated first heat transfer medium at the second temperature, a second transferring of at least a portion of the energy from first heat transfer medium at the second temperature to a working fluid at the first temperature, resulting in a heating of the working fluid to a third temperature between 700 and 1200° C. and a cooling of the first heat transfer medium to the first temperature, and converting at least a fraction of the portion of energy to electricity. In some embodiments of present disclosure, the first transferring may be performed using a resistive heater positioned within a silo. In some embodiments of the present disclosure, the first transferring may be performed using a receiver configured to receive solar radiation. In some embodiments of the present disclosure, the second transferring may occur within a first heat exchanger. In some embodiments of the present disclosure, the first heat exchanger may include a fluidized bed. In some embodiments of the present disclosure, the second transferring is completed using a heat exchanger positioned within the silo.

In some embodiments of the present disclosure, the first heat transfer medium may include at least one of concrete, gravel, rock, ash, silica, alumina, titanium, clay, or any other suitable inorganic material. In some embodiments of the present disclosure, the converting may include the expansion of the heated working fluid in a first turbine. In some embodiments of the present disclosure, the method may further include, prior to the first transferring, operating the turbine as compressor, by providing electrical energy to the turbine, where the operating transfers a least a portion of the electrical energy to the working fluid at the first temperature, resulting in the heating of the working fluid to the third temperature. In some embodiments of the present disclosure, the method may further include, prior to the first transferring, a third transferring of energy from the working fluid at the third temperature to the first heat transfer medium at the first temperature, resulting in a heating of the first heat transfer medium to a fourth temperature that is between the first temperature and the second temperature, where subsequently, the first transferring results in the heating of the first heat transfer medium from the fourth temperature to the second temperature.

In some embodiments of the present disclosure, the method may further include, after the second transferring, a fourth transferring of energy from the first heat transfer medium at the fourth temperature to a second heat transfer medium at a fifth temperature between −80 and −10° C., where the fourth transferring results in the cooling of the first heat transfer medium to a sixth temperature between 150 and 300° C., and the heating of the second heat transfer medium a seventh temperature between −10 and 20° C. In some embodiments of the present disclosure, the method may further include passing the working fluid at the fourth temperature through a second turbine, wherein the second turbine results in the producing of electricity. In some embodiments of the present disclosure, the method may further include a second heat transfer medium that includes a second plurality of solid particles at the seventh temperature and before the second transferring, a fifth transferring of energy from the second heat transfer medium to the working fluid, where the fifth transferring results in the cooling of the second heat transfer medium to the fifth temperature and the heating of the working fluid to the third temperature.

An aspect of the present disclosure is a system that includes a first heat transfer medium, a first working fluid, a first heat exchanger, and a second heat exchanger, where the first heat transfer medium includes a plurality of solid particles, the first heat transfer medium is capable of being heated by the first heat exchanger from a first temperature between 250 and 500° C. and a second temperature between 850° C. and 1300° C., a first conduit is configured to transfer the first heat transfer medium from the first heat exchanger to the second heat exchanger, and the second heat exchanger is configured to transfer heat from the first heat transfer medium at the second temperature to the first working fluid at the first temperature, resulting in the cooling of the first heat transfer medium from the second temperature to the first temperature and the heating of the first working fluid from the first temperature to a third temperature between 700 and 1200° C. In some embodiments of the present disclosure, the second heat exchanger may include a fluidized bed. In some embodiments of the present disclosure, the system may further include a first turbine, and a shaft, where the first working fluid at the third temperature is expanded through the first turbine, resulting in the first working fluid at the first temperature and the generation of electricity by the rotation of the shaft.

In some embodiments of the present disclosure, the first turbine may be operated as a compressor and may compress the first working fluid from the first temperature to the third temperature. In some embodiments of the present disclosure, the system may further include a second heat transfer medium, and a third heat exchanger, where the second heat transfer medium is capable of being cooled by the first working fluid from a fourth temperature between −10 and 20° C. to a fifth temperature between −80 and −10° C. in the third heat exchanger, and the third heat exchanger is configured to transfer heat from the first working fluid to the second heat transfer medium, resulting in a heated second heat transfer medium at the fourth temperature. In some embodiments of the present disclosure, the first working fluid may transfer heat from the first heat transfer medium at the second temperature to the second heat transfer medium at the fifth temperature, resulting in the first heat transfer medium at a sixth temperature between 150 and 300° C. and the second heat transfer medium at the fourth temperature. In some embodiments of the present disclosure, the second heat exchanger and the third heat exchanger may be fluidized bed heat exchangers.

BRIEF DESCRIPTION OF THE DRAWINGS

Exemplary embodiments are illustrated in referenced figures of the drawings. It is intended that the embodiments and figures disclosed herein are considered to be illustrative rather than limiting.

Figure 1:
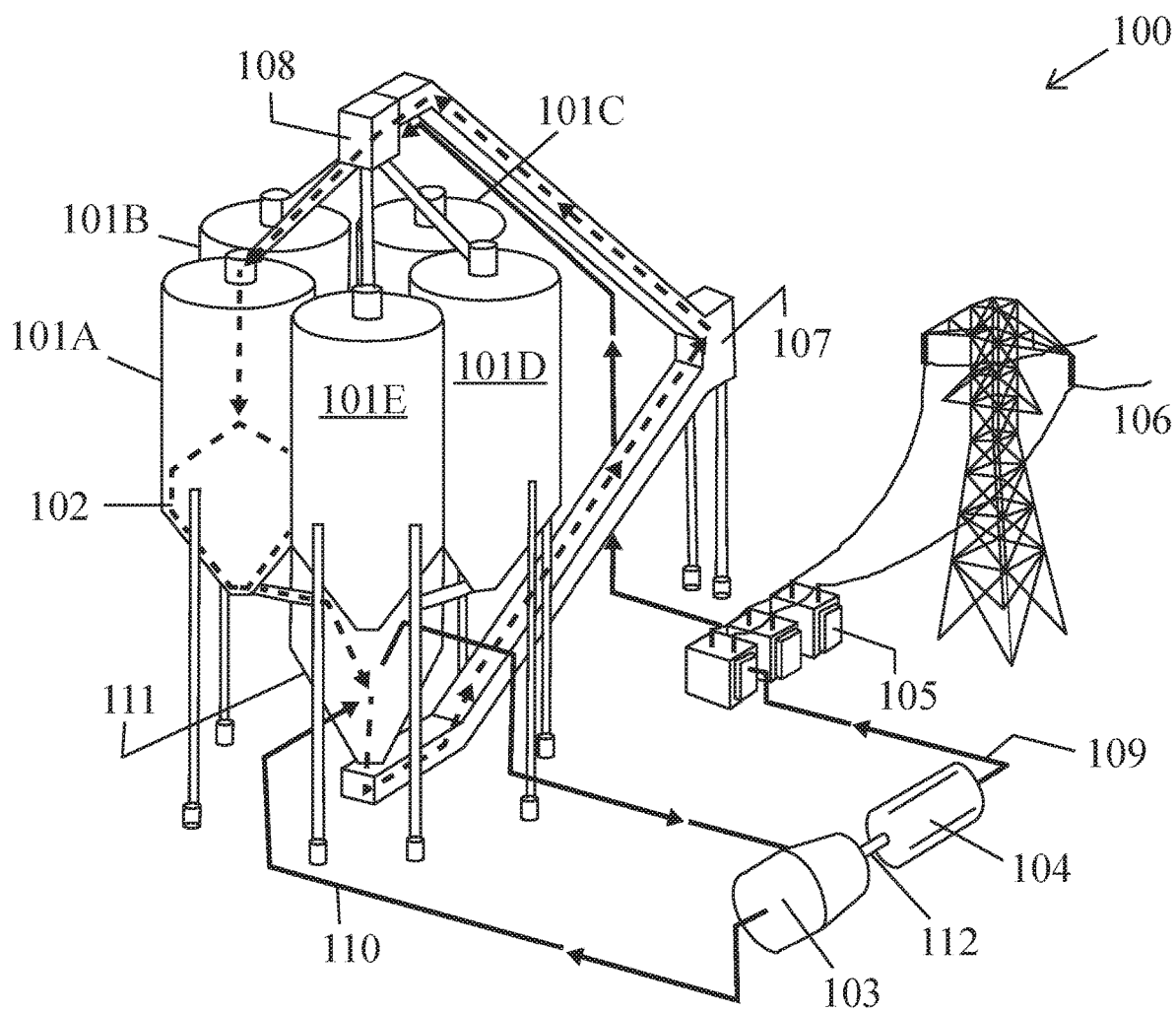
FIG. 1 illustrates a thermal energy storage system, according to some embodiments of the present disclosure.

REFERENCE NUMBERS 100 energy storage system
101 silo
102 solid particles and/or solid particle stream
103 turbine
104 generator or motor
105 substation
106 grid line
107 particle conveyor
108 heater
109 electricity
110 working fluid and/or working fluid stream
111 fluidized bed heat exchanger
112 shaft
200 energy storage system
201 separator
202 heat exchangers
203 pump
204 fan
205 water and/or water stream
400 method of charging energy storage system
405 heating working fluid and water
410 heating particles using working fluid and water
415 heating particles using electricity
420 storing particles
500 method of discharging thermal energy storage system
505 using particles to heat working fluid and water
510 expanding working fluid and water in turbines
600 energy storage system in charging mode
601 energy receiver
700 energy storage system in discharging mode
800 method of charging energy storage system
805 heating heated particles
810 storing heated particles
815 cooling working fluid
820 cooling cooled particles
825 storing cooled particles
900 method of discharging energy storage system
905 heating working fluid using heated particles
910 expanding working fluid in a turbine
915 cooling working fluid using cooled particles
920 expanding working fluid in a turbine
1000 modular particle heater
1001 heater module
1002 heating elements
1101 inner lining
1102 printed insulation layer
1103 gel insulator
1104 insulation layer attached to outer shell
1105 outer shell
1200 system around fluidized bed heat exchanger
1201 steam/particle heat exchanger
1202 inner shell

DETAILED DESCRIPTION OF SOME EMBODIMENTS

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present disclosure, the term "substantially" is defined as approaching a specific numeric value or target to within 20%, 15%, 10%, 5%, or within 1% of the value or target. In further embodiments of the present disclosure, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present disclosure, the term "about" is used to indicate an uncertainty limit of less than or equal to ±20%, ±15%, ±10%, ±5%, or ±1% of a specific numeric value or target. In some embodiments of the present disclosure, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure provides systems and methods for the storage, including long-term storage, of energy with specific examples including electrical energy and/or solar energy. In some embodiments of the present disclosure, surplus electricity generated using renewable energy sources such as wind and solar may be stored as thermal energy in the systems described herein. Later, for example during peak electrical demand periods, the stored thermal energy may be converted back to electrical energy, which may be transferred to the power grid to help meet the peak demand. Thus, the systems and methods described herein may expand the availability of renewable energy resources, such as solar power, wind power, or concentrated solar power (CSP) by allowing the storage of energy produced by these resources, with the subsequent return to the grid on an as-needed basis. Some embodiments of the present disclosure may utilize high-temperature heat cycles that transform the electrical energy (such as off-peak electrical energy) into thermal energy, storing the energy in heat transfer media constructed of solid particles.

In some embodiments of the present disclosure, an energy storage system may include a pressurized fluidized bed, a Brayton combined cycle for thermal-electricity generation, and low-cost solid particles as a medium for thermal energy storage. Such energy storage systems may operate in two modes: a charging mode and a discharging mode. During the charging mode, electrical energy received from the power grid (e.g. wind and/or solar) may be converted to thermal energy, which may be transferred to the solid particles, which may then be stored in a container until needed. Subsequently, during the discharging mode, the thermal energy may be recovered from the solid particles and converted to electricity, which may then be transferred back to the power grid. In some embodiments of the present disclosure, during the charging mode, an energy storage system may include an electric heater (i.e. resistive heater) configured to heat the solid particles using electrical energy supplied from the grid. In some embodiments of the present disclosure, during the discharging mode, a thermal energy storage system may include a fluidized bed heat exchanger configured to contact hot (thermally charged) solid particles with a working fluid, such that the resultant heated working fluid can be used to drive a turbine coupled to a generator, which then produces electricity that may be transferred to the power grid. In some embodiments of the present disclosure, a working fluid may be a gas, such as at least one of air, carbon dioxide, nitrogen, argon, and/or any other gas having a suitably high heat capacity. In some embodiments of the present disclosure, solid particles may include materials such as at least one of concrete, gravel, rocks, ash, silica, alumina, calcined clay, and/or any other suitable inorganic material having temperature stabilities up to the highest expected operating temperatures; e.g. up to about 1300° C.

FIG. 1 illustrates an energy storage system 100, according to some embodiments of the present disclosure. In this exemplary energy storage system 100, a silo 101 (i.e. a storage vessel; four shown 101A-D) is provide which may be utilized for the storage of the solid particles 102. A heater 108 may be positioned near and/or inside the silo 101, such that the heater 108 is configured to heat the solid particles 102 from a first relatively low temperature of approximately 250 to 500° C. to a second relatively high temperature approximately 850 to 1200° C. during the charging mode. In some embodiments of the present disclosure, a heater 108 may be an electric heater (e.g. using resistive heating elements), with the electric power needed to drive the electric heater provided from the grid as shown by electricity 109. However, the solid particles 102 may be heated by other means/sources, including for example, solar energy (e.g. provided by concentrated solar power (CSP) facilities), geothermal energy, and/or energy supplied from industrial sources. The heated particles 102, and the thermal energy stored within the particles 102, may then be stored within the silo 101 until such a time when electrical needs requires that the thermal energy be converted back to electricity.

In some embodiments of the present disclosure, when the electricity is needed, the hot solid particles 102 may be transported from the silo 102 to the fluidized bed heat exchanger 111. In some embodiments, as shown in FIG. 1, when the fluidized bed heat exchanger 111 is an integral component of the silo 102, the hot solid particles 102 may be transported from within the silo 102 to the fluidized bed heat exchanger 111 by gravity. In some embodiments of the present disclosure, for example when the fluidized bed heat exchanger 111 is not an integral part of the silo 102, the hot solid particles 102 may be transported to a fluidized bed heat exchanger 111 pneumatically and/or mechanically (e.g. by the use of a conveyer similar to particle conveyor 107). The fluidized bed heat exchanger 111 may be configured to transfer heat from the solid particles 101 to a working fluid 110, e.g. an inert gas, thereby heating the working fluid 110 to a temperature between 700 and 1200° C. and cooling the solid particles 102 to a temperature between 250 and 500° C.

The heated working fluid 110 may subsequently be directed to a turbine 103, which in turn may drive a shaft 112 connected to a generator or motor 104, such that the thermal energy recovered from the solid particles, is first transformed to pressure energy, then mechanical energy, and finally electrical energy 109, which may then be transferred to a substation 105 and finally to a grid line 106 for transport to the power grid. The now expanded and cooled working fluid 110, now at a temperature between 250 and 500° C. may then be directed to a compressor (not shown) to provide the driving force needed to circulate the working fluid 110 back through the fluidized bed heat exchanger 111.

In some embodiments of the present disclosure, an energy storage system 100 may be incorporated into a concentrated solar power (CSP) plant to store at least one of solar energy collected from the CSP plant and/or electrical energy received from the power grid. For the case where solar energy is stored in the energy storage system, the solid particles described herein may replace at least a portion of the liquid storage media (e.g. molten salts) typically used in CSP systems. The heat from the CSP plant may be directed to the silo 101 to heat the particles 102, thereby storing the thermal energy generated by the CSP plant.

Figure 2:
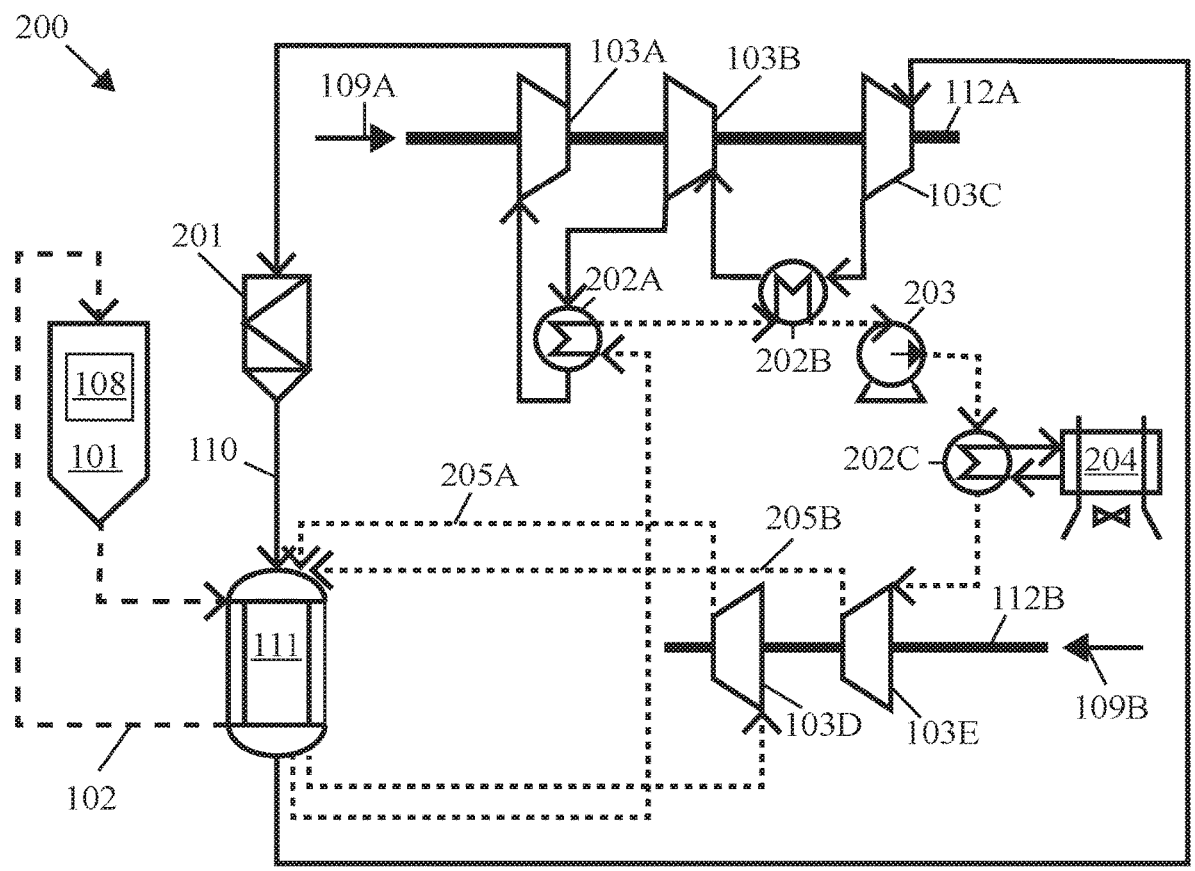
FIG. 2 illustrates a flowchart of a thermal energy storage system, according to some embodiments of the present disclosure.

The electricity (109A-B) supplied to the energy system 200 in charging mode as shown in FIG. 2 may be supplied from the electrical grid, from a coal-fired power plant, or from a CSP plant. The combination of heat provided to the solid particles 102 via the heater 108, the working fluid 110, and the water streams 205A-B allows the solid particles 102 to reach extremely high temperatures. For example, using this combination of heating methods the solid particles 102 may reach temperatures as high as 1300° C. The steps in this combination of heating methods are explained in the next paragraph.

FIG. 2 illustrates a process flow diagram version of an energy storage system 200 similar to the energy storage system 100 illustrated in FIG. 1, in a charging mode. A notable difference between this energy storage system 200 and the energy storage system 100 of FIG. 1, is that this energy storage system 200 includes a water/steam stream 205, which acts as a second working fluid. Referring to FIG. 2, this exemplary energy storage system 200 includes a silo 101 for storing the solid particles 102. During the charging mode as shown in energy storage system 200, the solid particles 102 may be heated in the pressurized fluidized bed heat exchanger 111 by the working fluid 110 and the water 205. The solid particles 102 may also be heated by an electrical heater 108, which may be positioned within the silo 101. The working fluid 110 may be routed through one or more turbines 103. Multiple turbines 103 may be utilized in conjunction with a second heat transfer fluid, for example water 206, as shown in FIG. 2, in a Brayton combined cycle configuration. For example, turbines 103A-C may share a single shaft 212A which, during charging, may receive electricity 109A, thus providing the power input to the system 200 needed to compress the working fluid 110 in the turbines 103A-C. A first water stream 205A, may be routed through a single turbine 1032D, which, during charging, may receive electricity 109B via shaft 112B, thus providing additional power input into the system 200 The water stream 205A may then be routed through the fluidized bed heat exchanger 111, where it may heat the solid particles 102. A second water stream 205B may enter a series of heat exchangers 202A-C and a pump 203 which heat the second water stream 205B with heat provided by the working fluid 110. The second water stream 205B may then be routed through a turbine 103E, where additional electrical energy 109B is supplied via shaft 112B.

Figure 3:
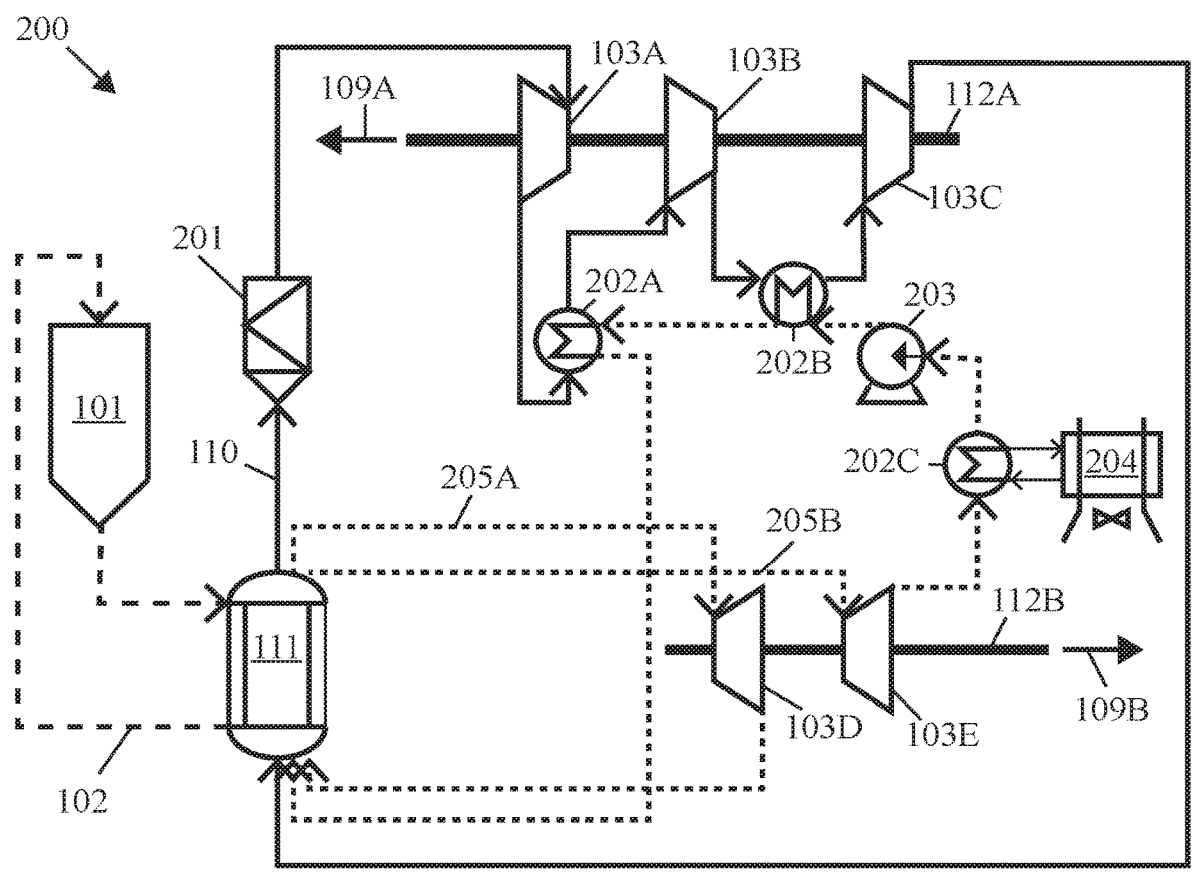
FIG. 3 illustrates a method of charging the thermal energy storage system of FIGS. 1 and 2, according to some embodiments of the present disclosure.

FIG. 3 shows an energy storage system 200 in the discharging mode, where the thermal energy stored in the solid particles during the charging mode is recovered and converted to electrical energy. This is accomplished by transfer of the thermal energy from the solid particles to the working fluid 110 in the fluidized bed heat exchanger 111 and the water stream 205A-B in a heat exchanger (not shown) within the fluidized bed heat exchanger 111. A separator 201 may be included to physically separate the working fluid 110 from any entrained solid particles 102 carried out of the fluidized bed heat exchanger 111. During the discharging mode the passing of the working fluid 110 or the water stream 205A-B through a turbine 103A-E results in the expansion of that fluid, which rotates the shaft 109A-B, generating electricity 109A-B.

To release electricity during the discharging mode shown in FIG. 3, the first turbine 103A may be driven by the high temperature working fluid 110 (e.g. gas) exiting the separator 201 (from the fluidized bed heat exchanger 111), generating a first amount of shaft work, transferred to the shared shaft 112A. The slightly cooled working fluid 110 exiting the first turbine 103A may then heat the water stream 205B in a first heat exchanger 202A. The heated working fluid 110 (e.g. gas) may then be passed through a second turbine 103B, resulting in the generation of a second amount of shaft work transferred to the shared shaft 112A. This second cooled stream of working fluid 110 (e.g. gas) may heat for a second time by the water stream 206 in a second heat exchanger 202B. The resulting heated working fluid 110 (e.g. gas) may then be passed through a third turbine 103C, resulting in the generation of a third amount of shaft work transferred to the shared shaft 112A. The working fluid 110 may heat a water stream 205B in two heat exchangers, 202A and 202B before returning the fluidized bed heat exchanger 111. The water stream 205B may also be routed through the fluidized bed heat exchanger 111 and may enter turbines 103D-E, which may be oriented around a shaft 112B. The rotation of the shaft 112B may generate electricity 109B, which may be released from the system to the grid or in another useful manner. The energy storage system 200 may also include a condenser 202C for steam cooling in a Rankine-steam cycle and a fan 204 acting as an air-cooled condenser, that is, the water stream 205B is condensed in condenser 202C and fan 204.

As thermal energy storage media, large volumes of low-cost, stable granular particles may be heated to ultrahigh temperature (approximately 850-1300° C.) in the fluidized bed heat exchanger 111 by electricity (not shown). The heating may be performed using resistive heating. The silo 101 may be made of concrete with enough internal insulation to store the particles at high temperatures at large capacity. The fluidized bed heat exchanger 111 may be a pressurized fluidized bed heat-exchanger design for transferring heat from the particles to the working fluids. A Brayton combined cycle power generation cycle utilized by the energy storage system 200 may convert at least a portion of the stored thermal energy back into electricity which may be used by the electrical grid (109A-B in FIG. 3). The Brayton combined cycle power generation cycle may enable the energy storage system 200 to achieve a round-trip storage efficiency of greater than 50% across a 10 hour to 100-hour storage duration.

In some embodiments, the energy storage system 200 may be sited in various geographical locations. For example, the energy storage system 200 may be sited at retired coal-fired power plants to leverage existing infrastructure for further cost reductions. The energy storage system 200 may disrupt contemporary thermal energy storage technologies (such as molten salt) by developing and demonstrating ultrahigh temperature particle heating and storage coupled with a novel pressurized fluidized bed heat exchanger 22, which facilitates gas/particle direct-contact to support a high-efficiency Brayton combined cycle power system.

In some embodiments, the charging process may use low-cost alternating current grid electricity power-resistive elements to heat particles at a rapid ramp-up rate. In other embodiments the electricity may be generated by traditional sources, such as coal-fired power plants. Regardless of its source, the electricity 109A-B may enter the energy storage system 200 through heater 108 which releases heat into the silo 101 and the rotation of shafts 112A-B.

Figure 4:
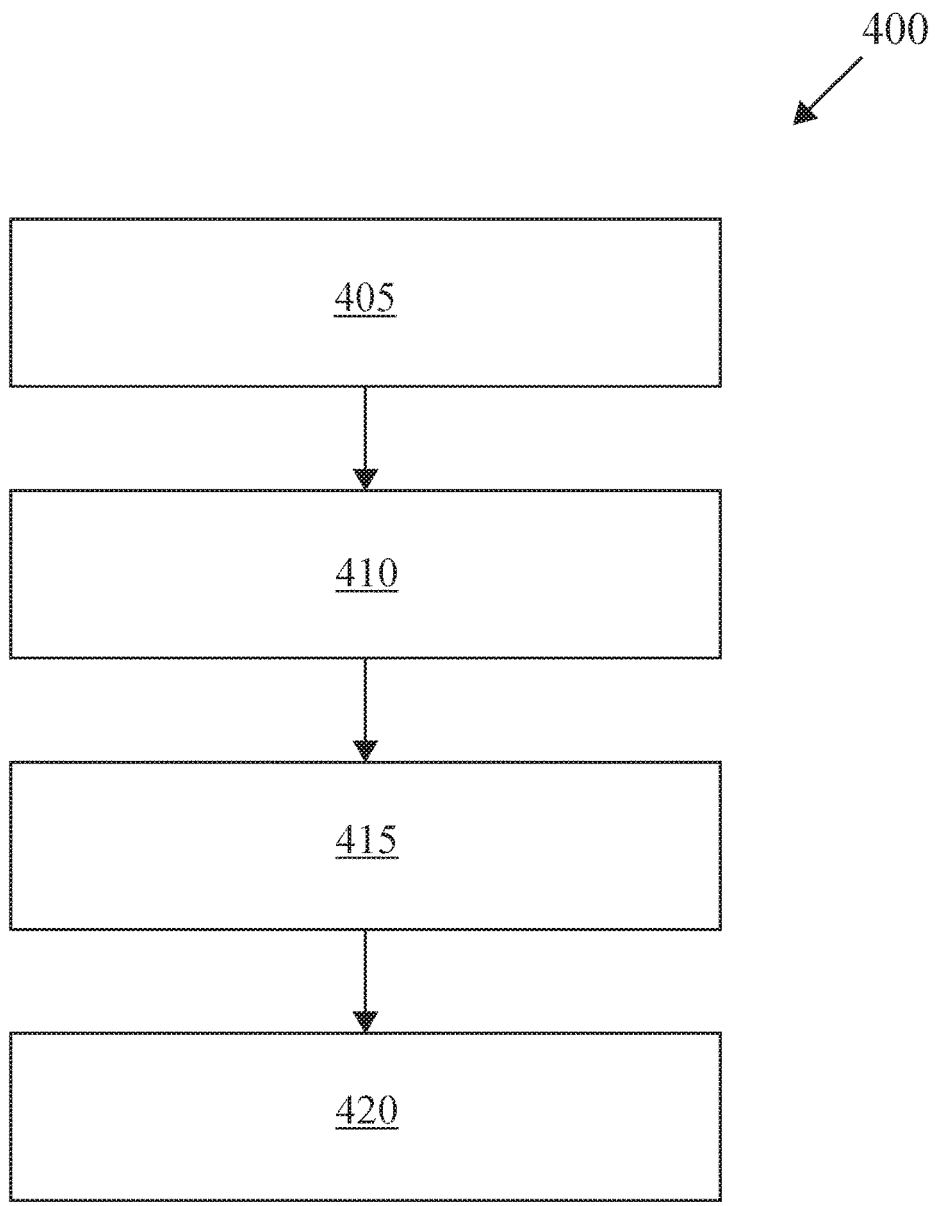
FIG. 4 illustrates a method of discharging the thermal energy storage system of FIGS. 1 and 2, according to some embodiments of the present disclosure.

FIG. 4 illustrates a method of charging the energy storage system 200 shown in FIG. 2, as described by some embodiments in the present disclosure. This exemplary method 400 of charging the energy storage system 200 includes four steps. The first step includes heating the working fluid 110 and water stream 205A-B, 405. The heating of the working fluid 110 in turbines 103A-C may be done using electricity 109A. The water stream 205B may operate as a second working fluid and may be heated in turbines 103D-E using electricity 109B. The working fluid 110 may reach temperatures of 700 to 1200° C. and the water stream 105A-B may reach temperatures of up to 500° C. during this step.

The second step of the method of charging 400 the energy storage system 200 includes heating the solid particles 102 410 using the working fluid 110 and the water stream 205A-B in the fluidized bed heat exchanger 111. The heat transfer may be directly from the working fluid 110 and the water stream 205A-B to the solid particles 102.

The third step of the method of charging 400 the energy storage system 200 includes heating the particles 415 using electrical heating. Heating the particles may involve using electricity supplied directly to the silo 101 through heater 108. The heating may be done using ceramic heating elements or resistive heating. The heater 108 may be positioned within the silo 101 as shown in FIG. 2 or may be outside of the silo 101 as shown in FIG. 1.

The fourth step of the method of charging 400 the energy storage system 200 includes storing the heated solid particles 102 in the silo 101, 420. This step 420 is storing the thermal energy contained within the particles, which then may be released and converted to electrical energy when electrical energy is desired. The silo 101 may be made with refractory inner materials and/or multiple layers to reduce the loss of energy during the storing of the solid particles 102, 420.

Figure 5:
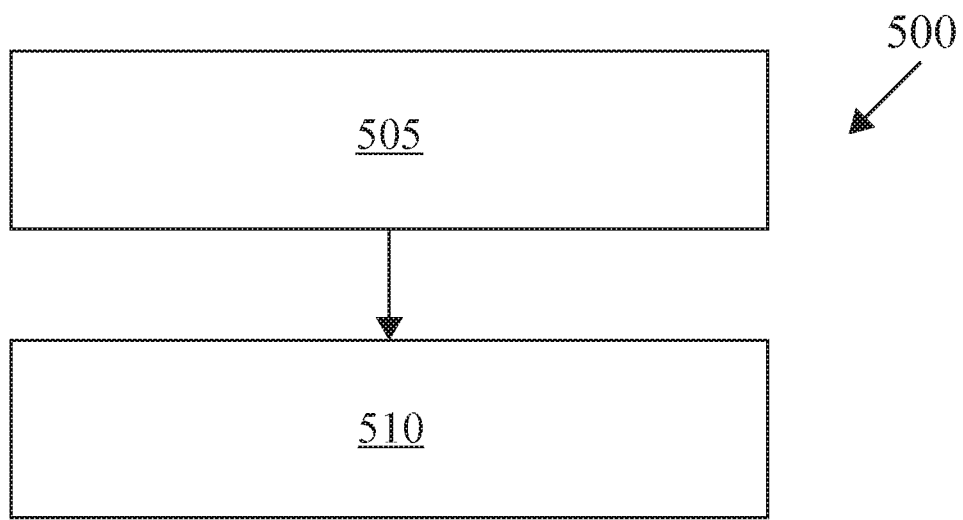
FIG. 5 illustrates a flow chart of a particle thermal energy storage system in the charging mode, according to some embodiments of the present disclosure.

FIG. 5 illustrates a method of discharging 500 the energy storage system 200 shown in FIG. 3 and described herein. The method of discharging 500 the energy storage system 200 includes first utilizing the solid particles 102, to heat the working fluid 110, 505. In some embodiments, a water stream 205A-B may also be heated by the solid particles 102 in the fluidized bed heat exchanger 111. The solid particles 102 may be heated to extremely high temperatures (e.g., >1000° C.) during the charging process, and during the discharging process can heat the working fluid 110 and water stream 205A-B using this extremely elevated temperature.

The method of discharging 500 the energy storage system 200 shown in FIG. 3 includes expanding the working fluid 110 in turbines 103A-C and expanding the water stream 205A-B in turbines 103D-E, 510. Note that the number of turbines 103A-E in FIGS. 2 and 3 is meant to be illustrative and not limiting. The actual number of turbines 103A-E could range from a single turbine to over ten turbines. The expansion of the working fluid 110 and water stream 205A-B reduces their temperatures, releasing the thermal energy that has been stored in the particles. The expansion of the working fluid 110 and water stream 205A-B in the turbines 103A-E rotates the shafts 112A-B, which generates electrical energy 109A-B. The electrical energy 109A-B can be released to the grid or utilized on site.

In some embodiments, the silo 101 may be a large, low-cost hot-particle silo used for energy storage containment. The silo 101 may include a concrete shell, interior silicate insulation and refractory lining, and an exterior mineral wool insulation. Multiple silos may be used in a single energy storage system 200 as shown in FIG. 1. For example, at the 300 MWe design point using silica sand as thermal energy storage media, 11 individual 6,415,000 L hot silos may be used.

High charge efficiencies may be achieved because of resistive heating of the solid particles using grid electricity. A discharge efficiency of 50-60% may be achieved by optimizing the Brayton combined cycle design based on a high-efficiency gas turbine combined cycle (GTCC) plant. A low self-discharge rate of less than 5% per week may occur during an idle period due to the absence of internal natural convection—an inherent, self-insulating benefit of solid-particle thermal energy storage.

In some embodiments of the energy storage system 500, the solid particles may be heated to high temperatures between 500 and 800° C. on the hot side and cooled to low temperatures between −200 and 0° C. on the cold side. Cold storage may be particle or liquid. The electricity storage may use low-cost grid electricity with a Carnot battery approach.

Figure 6:
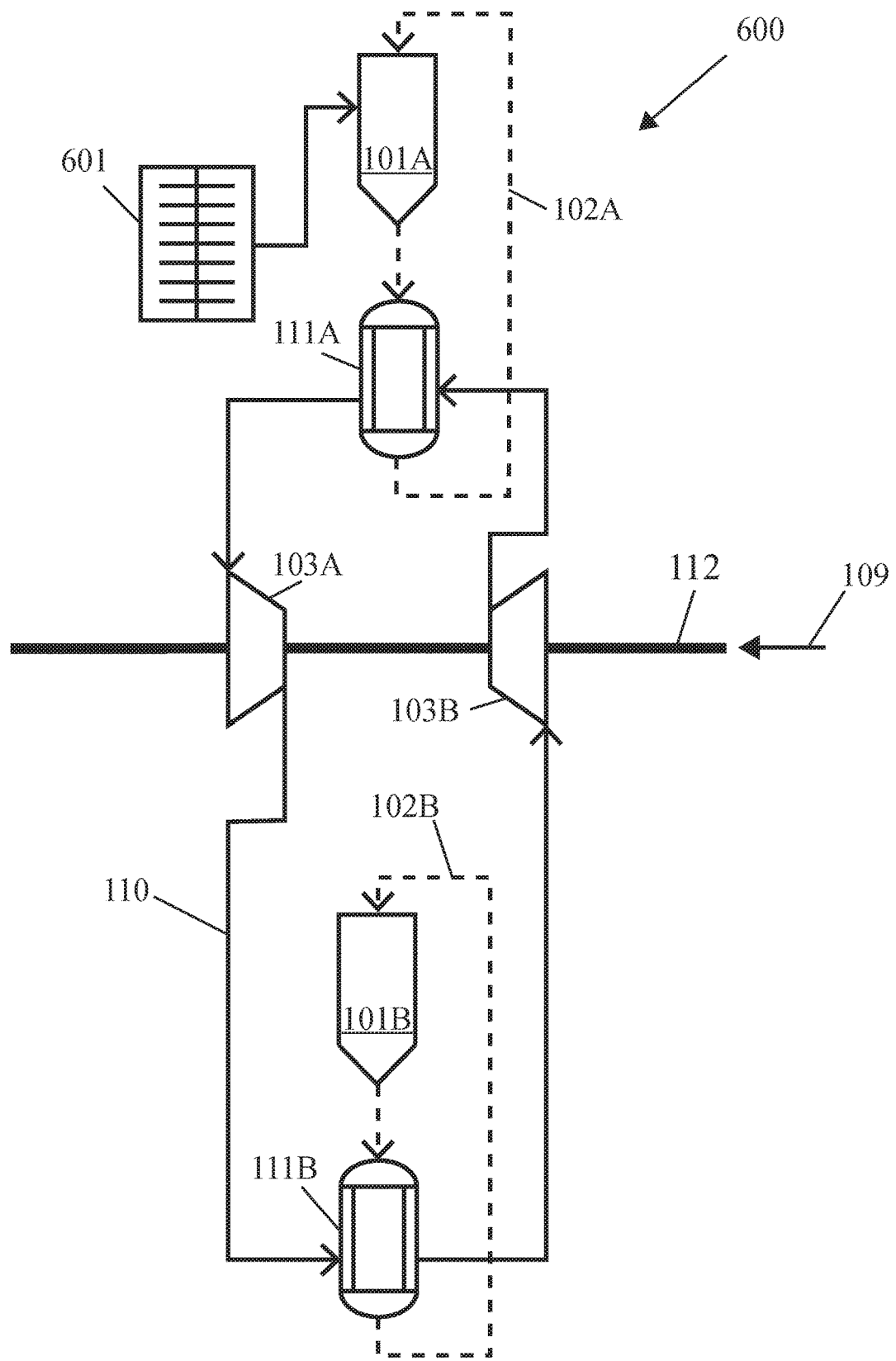
FIG. 6 illustrates a flow chart of a particle thermal energy storage system in the discharging mode, according to some embodiments of the present disclosure.

FIG. 6 shows a flow chart for an energy storage system 600 in the charging mode, according to some embodiments herein. The energy storage system 600 includes a heated fluidized bed heat exchanger 111A, which may be used to heat solid particles 102A, which are then stored within a heated silo 101A. An energy receiver 601 may be used to heat the solid particles 102A within the silo 101A. System 600 may be connected to a concentrated solar power (CSP) plant and receive heat from the CSP system, store that heat in the particles, and release it to the electrical grid as needed. Pairing the disclosed particle TES systems with CSP allows a CSP plant to store both solar heat and low-cost grid electricity in the heated particles. The range of working fluid temperature circulating through a receiver also couples to the energy storage system charging temperature and power turbine inlet temperature. The advantage of generating a cold storage heat sink may significantly benefit the power cycle without incurring wet cooling, which is beneficial when operating a CSP plant in a desert area.

A working fluid 110 is routed through the heated fluidized bed and through a first turbine 103A before going to the cooled pressurized fluidized bed 111B. A cooled silo 101B can store the cooled solid particles 102B which are circulated through the cooled fluidized bed heat exchanger 111B. The working fluid 110 then is routed through a second turbine 103B which acts as a compressor and heats the working fluid 110. Both turbines 103A-B may be coaxially located around a shaft 112. During charging, the shaft 112 may be rotated by the application of electricity 109B.

In the charging mode shown in FIG. 6, the pressurized working fluid 110 is compressed by a compressor (turbine 103B) driven by an electric motor (not shown) that uses electricity 109 during the charging mode. The high-temperature working fluid 110 from the compressor/turbine 103B contributes to solid particle 102A heating in the heated fluidized-bed heat exchanger 111A when it fluidizes heated solid particles 102A. In some embodiments of the present disclosure, solar heat collected by a working fluid 110 heats the solid particles 102A in the fluidized-bed heat exchanger 111A. The solid particles 102A in the exhaust working fluid 110 gas (not shown in FIG. 6) from the fluidized bed heat exchanger 111 are removed by a gas/particle separator 108 (not shown in FIG. 6), which may be a cyclone, and the cleaned gas flows through a turbine, where it expands and cools. The cold energy (that is, lack of heat) of the cool working fluid 110 gas may be stored in cold-particle storage silo 101B to become a heat sink, which may be used during discharging to reduce the compressor inlet temperature for efficient power generation by the discharging Brayton cycle. In the discharging Brayton cycle shown in FIG. 6, the hot particles heat the compressed gas and drive the power turbine for power production.

Figure 7:
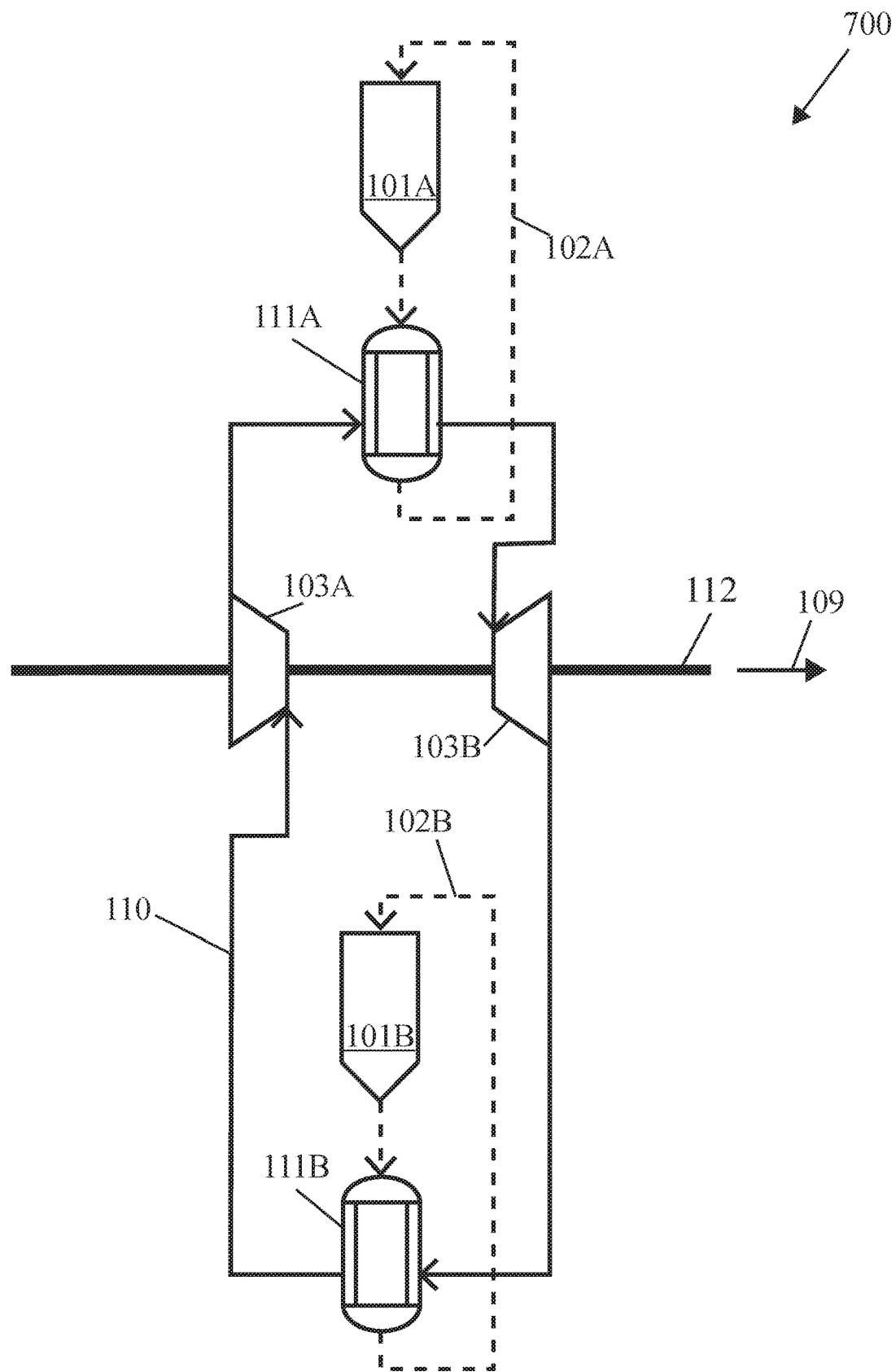
FIG. 7 illustrates a method of charging the particle thermal energy storage system of FIG. 5, according to some embodiments of the present disclosure.

FIG. 7 shows a process flow chart for a pumped energy storage system 700 in the discharging mode, according to some embodiments. During discharging, heat from the heated particles 102A is transferred (via the working fluid 110) to the cooled particles 102B. During this heat transfer the working fluid 110 passes through turbines 103A-B and expands. The expansion of working fluid 110 in turbines 103A-B rotates the shaft 112, generating electrical energy 109. Generating electrical energy 109 releases the thermal energy stored in the particles during the charging process (shown in FIG. 6).

In some embodiments, stable, inexpensive, solid particles may be used as the energy-storage media. The storage media (i.e., the particles) may be silica sand, modified coal ash, or calcined flint clay. The particles may have high energy density, a low capital cost per unit of usable energy, and a high melting temperature. The particles also should be stable over the desired operating temperature range and demonstrate superior fluidization and heat-transfer properties. Table 1 shows four potential particle materials and lists their relevant properties and resultant cost metrics. This list is not meant to be exhaustive and other particle/media options may exist. Potential energy storage media may be screen based on their stability at temperatures greater than 1100° C., relative energy densities, cost of acquisition and particle preparation, and regional abundance. In some embodiments, the target hot-particle temperature may be 1170° C. The stability including potential sintering and agglomeration may be between 850-1200° C.

heating element (such as 108, not shown in FIG. 6) using power from an electrical receiving unit 601 and/or in the heated fluidized bed heat exchanger 111A by the working fluid 110. Next, the method of charging 800 the pumped energy storage system 600 includes storing the heated particles 102A in the heated silo 101A, 810. The method of charging 800 the pumped energy storage system 600 includes next cooling the working fluid 110 in the turbine 103B, 815. The method of charging 800 the pumped energy storage system 600 includes cooling the cooled particles 102B in the cooled fluidized bed heat exchanger 111B, 820. Finally, the method of charging 800 the pumped energy storage system 825 includes storing the cooled particles 102B in the cooled silo 101B, 825.

Figure 9:
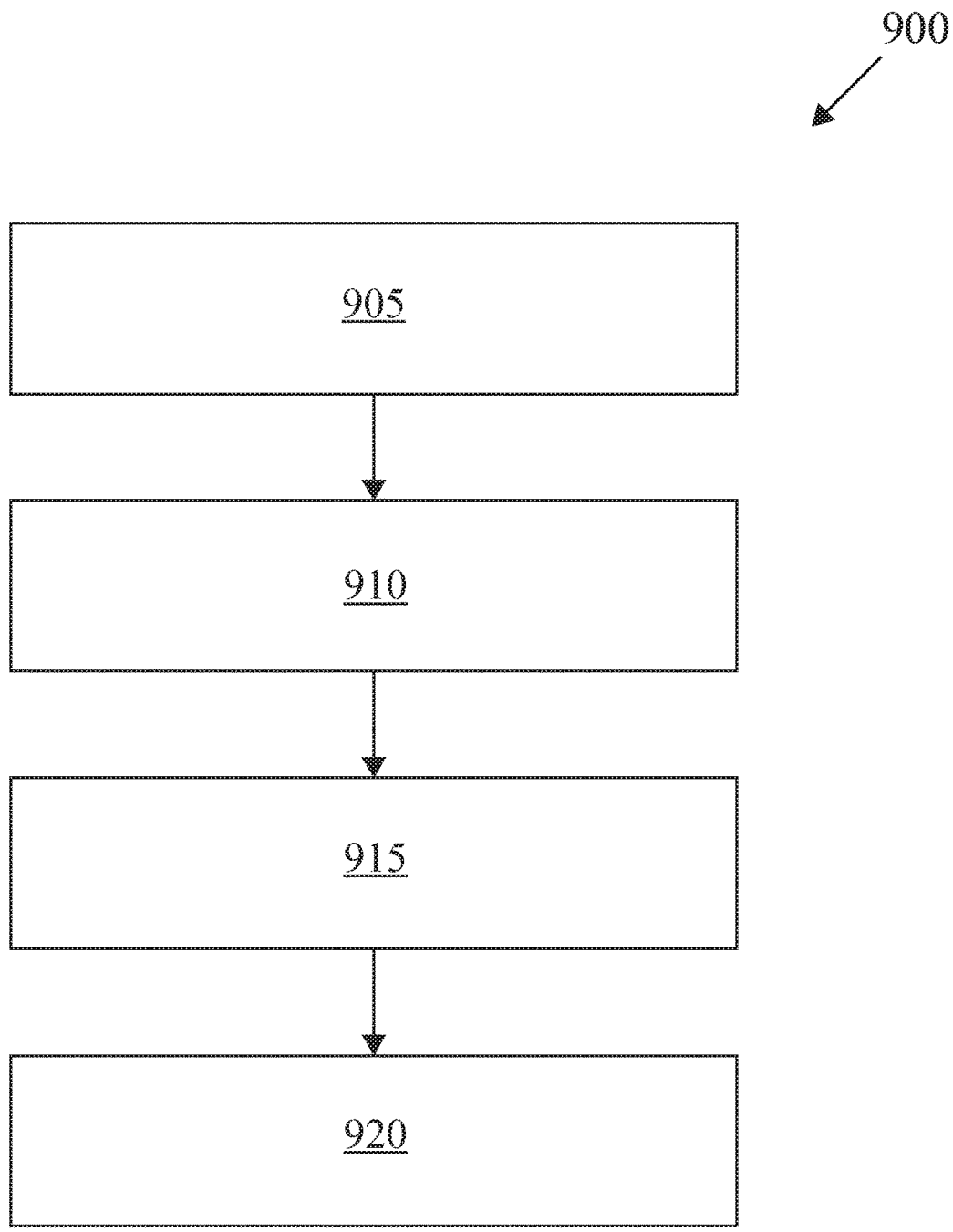
FIG. 9 illustrates a modular particle heater which may be used internal or external to a storage silo, according to some embodiments of the present disclosure.

FIG. 9 shows the method of discharging 900 the pumped energy storage system 700 shown in FIG. 7. The method of discharging 900 the pumped energy storage system 700 includes using the heated particles 102A to heat the working fluid 110 in the heated fluidized bed heat exchanger 1110A, 905. Next, the method of discharging 900 includes expanding the working fluid 110 in turbine 103B, 910. The method of discharging 900 includes cooling the working fluid 110 in the cooled fluidized bed heat exchanger 111B using the cooled solid particles 102B, 915. Next, the method of discharging 900 includes expanding the working fluid 110 in the turbine 103A, 920. Expanding the working fluid 110 in turbines 103A-B rotates the shaft 112, which generates electrical energy 109.

The method of discharging 900 converts thermal energy stored in the solid particles 102A-B into alternating current power. This is done by heating the working fluid 110 using the fluidized bed heat exchangers 111A-B, then expanding the working fluid 110 in the Brayton combined cycle turbines 103A-B, which rotates the shaft 112. The goal in silo 101A is to achieve ultrahigh solid particle 102A storage temperature (for example, 850-1300° C.) to support the high-efficiency energy storage system 700 described herein. Higher particle temperatures allow for higher turbine-inlet temperatures to achieve higher power-generation efficiencies.

In some embodiments, ceramic heating elements (108, not shown in FIG. 6-7) in the silo 101A may be used for heating solid particles 102A. These ceramic heating elements may operate at temperatures exceeding 1200° C. Alternatively, electric resistive particle heaters (108, not shown in FIG. 6-7) inside the top section of the silo 102A may be used to

TABLE 1

Relevant properties and cost metrics for potential storage media.

| | | Media Properties | | Media Cost Metrics | | |
|---|---|---|---|---|---|---|
| ID Media | Density (kg/m³) | $C_p$ (J/kg-K) | Melting T (° C.) | Cost ($/ton) | E Dens. (kWht/L) | Cost** ($/kWht) |
| 1 Coal (fly) ash | ~2,000 [8] | 1,098* [11] | 1,183-1,640 [8] | (−40)-20 [10] | 0.57 | (−0.07) |
| 2 Silica sand (β-quartz) | 2,650 [8] | 1,155* [9] | 1,710 [8] | 20-30 | 0.79 | 0.09 |
| 3 Calcined flint clay | 2,500 [12] | 1,050 [13] | 1,500 [12] | 80-120 | 0.68 | 0.38 |
| 4 Brown fused alumina | 3,950 [14] | 1,321* [15] | 2,000 [14] | 50-700 | 1.35 | 0.98 |

*Values averaged over the operating range: 300°-1100° C.;
**Determined using median cost.

Figure 8:
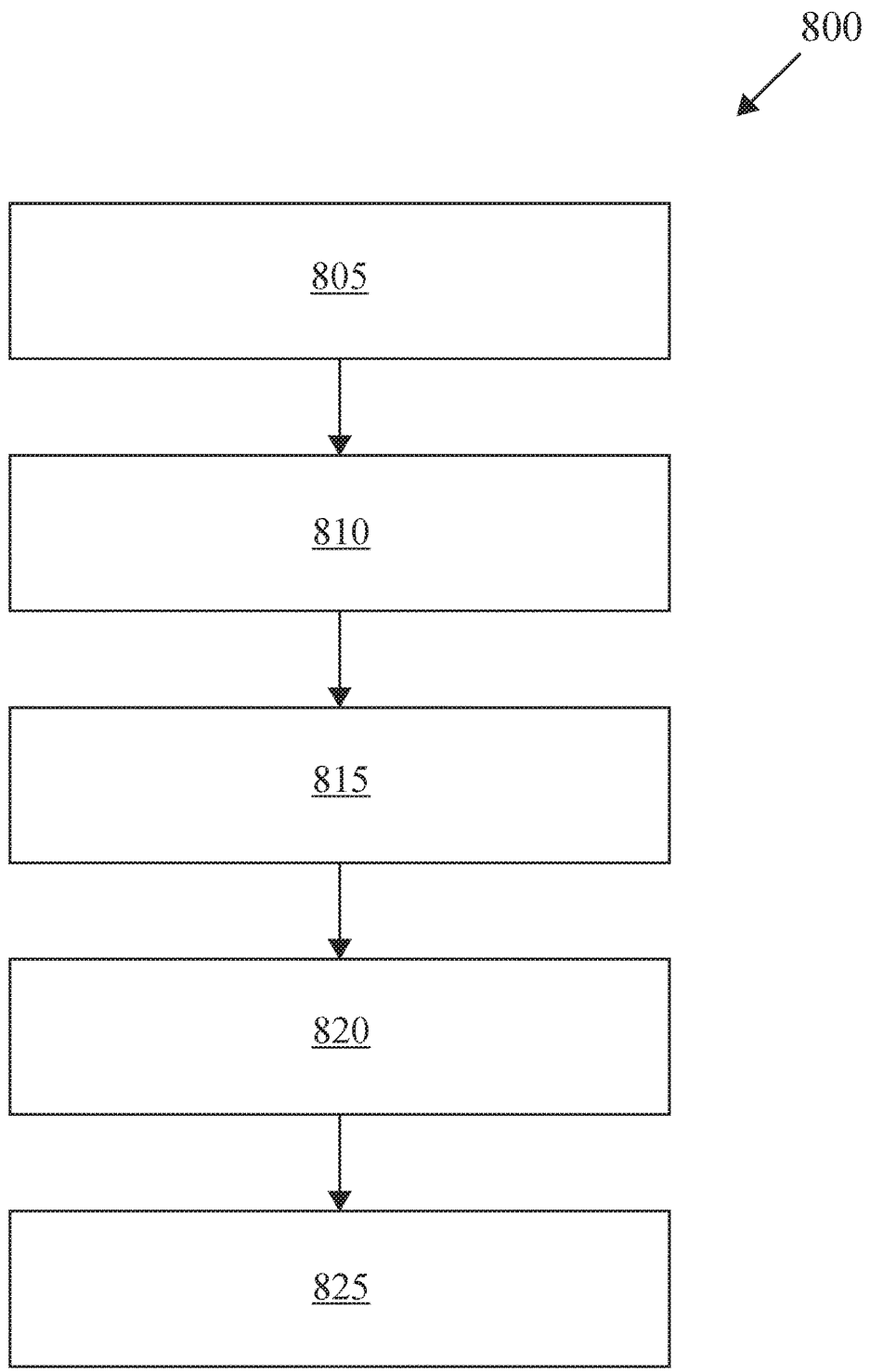
FIG. 8 illustrates a method of discharging the particle thermal energy storage system of FIG. 6, according to some embodiments of the present disclosure.

FIG. 8 shows the method of charging 800 the pumped energy storage system 600 shown in FIG. 6. The method of charging 800 the pumped energy storage system 600 includes first heating the heated particles 102A, 805. The heating may be done in both the silo 101A using an in-silo heat the particles to approximately 1170° C. Temperatures in the silo 102A for the heated solid particles 102A may exceed 800° C.

Figure 10:
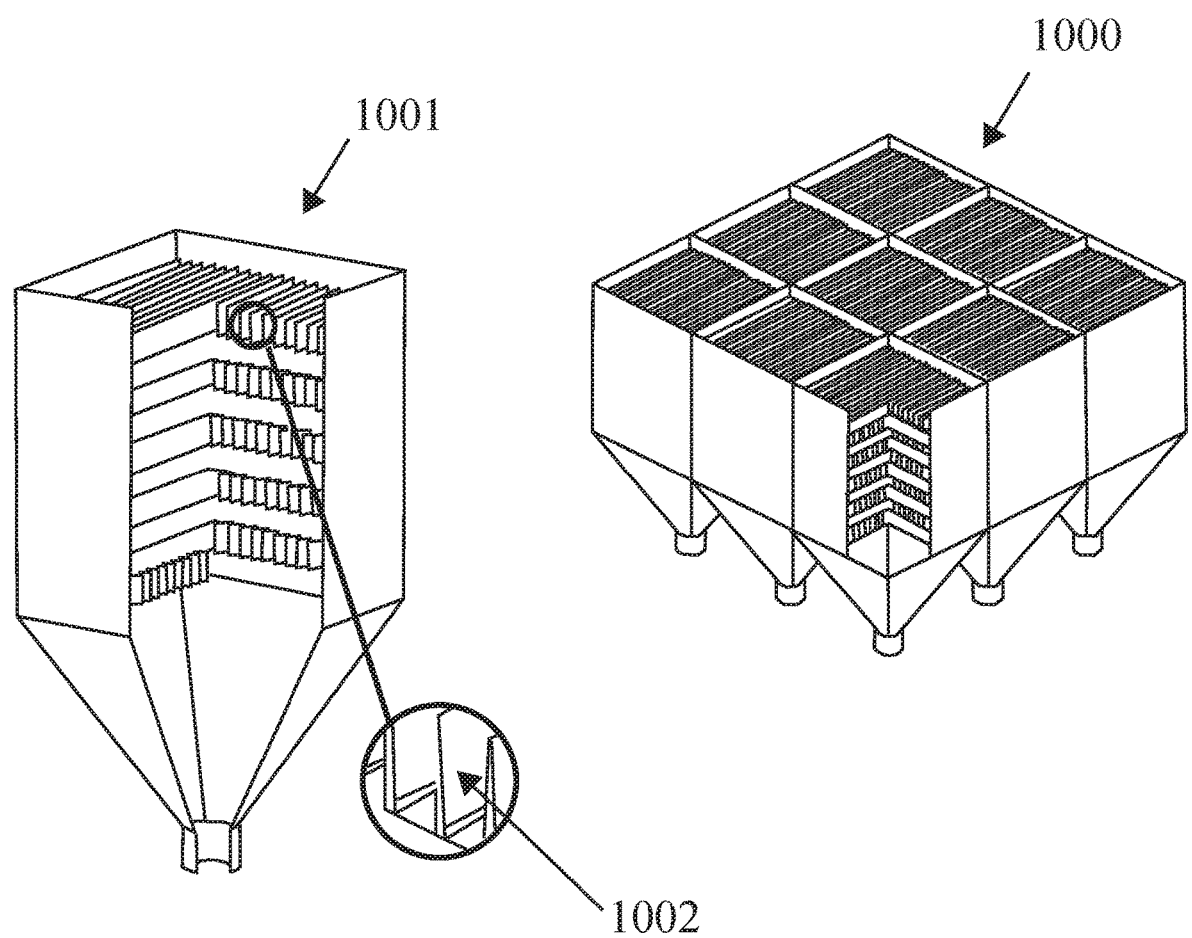
FIG. 10 illustrates a storage silo design, according to some embodiments of the present disclosure.

In some embodiments, the energy storage system may include a particle heater that uses electricity to heat the solid particles beyond temperatures possible by the particles using the working fluid and/or water stream. FIG. 10 shows a modular particle heater 1000 which may be used to heat particles within a storage silo (for example, a modular heater 1000 may be a heater 108 as shown in FIG. 2). A single heater module 1001 and heating elements 1002 are shown in detail. The heating elements 1002 may use convection or conductive heating to heat the solid particles. The heating using the modular particle heater 1000 may occur within a storage silo and may be assisted by the design of the silo, which may prevent heat loss and even reflect energy back to the solid particles.

Figure 11:
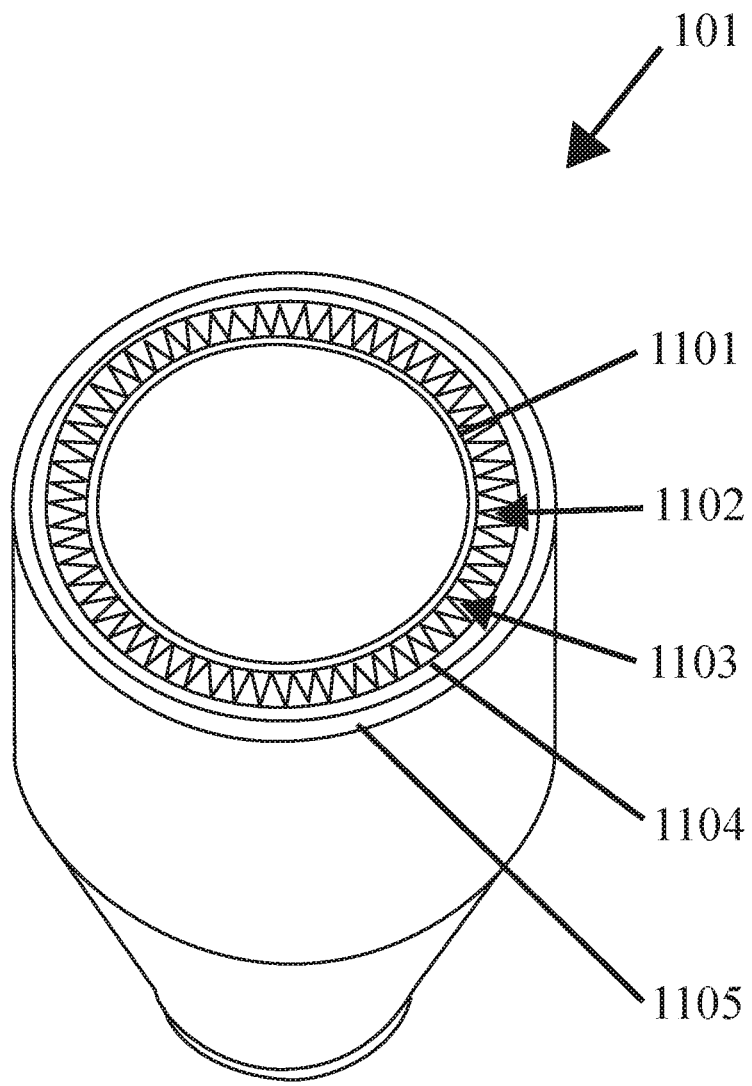
FIG. 11 illustrates pressurized fluidized bed heat exchanger components of a thermal energy storage, according to some embodiments of the present disclosure.

For example, the silo 101 shown in FIG. 11 uses calcium silicate interior insulation and refractory lining, wrapped by an exterior mineral-wool insulation to maintain solid particle temperature. Table 2 summarizes key media and containment costs for four potential particles. The present disclosure describes storing large volumes of granular media at ultrahigh temperatures (approximately 850-1300° C.) while minimizing heat loss.

FIG. 11 illustrates a silo 101. Silo design and size may be function of plant capacity based on the various loadings and codes. The silo 101 includes an inner lining 1101, a printed insulation layer 1102, a super insulator 1103, an isolation layer 1104, and an outer shell 1105. The inner lining 1101 may have abrasion resistance and be heat transfer media (i.e., solid particle) compatible. The printed insulation layer 1102 may have insulation layers. The super insulator 1103 may be an aerogel type to fill any gaps in the printed insulation layer 1102. The isolation layer 1104 is attached to the outer shell 1105. The outer shell 1105 may be made of concrete, steel, aluminum, or another suitable material. In some embodiments, the silo 101 may use calcium silicate interior insulation and refractory lining, wrapped by an exterior mineral-wool insulation.

TABLE 2

Initial TEA on a 300-MWe energy storage system (design point: 55-GWht for d = 100 h, $\eta_D$ = 54%)

| | | Ash | Sand | CFC | BFA |
|---|---|---|---|---|---|
| Media | Weight (kiloTon) | 199 | 189 | 208 | 165 |
| | Cost ($MM) | −3.97 | 4.72 | 20.78 | 53.68 |
| | Cost ($/kWht) | −0.07 | 0.09 | 0.38 | 0.98 |
| | Cost ($/L) | −0.04 | 0.07 | 0.25 | 1.28 |
| Containment | Volume (m³) | 99,000 | 71,000 | 83,000 | 42,000 |
| | Total cost ($MM) | 88.26 | 63.32 | 73.83 | 37.14 |
| | Cost ($/kWht) | 1.62 | 1.16 | 1.35 | 0.68 |
| | Capital cost ($/L) | 0.89 | 0.89 | 0.89 | 0.89 |
| | Energy density (kWht/L) | 0.57 | 0.79 | 0.68 | 1.35 |
| TES Cost Sum ($/kWht) | | 1.55 | 1.25 | 1.73 | 1.67 |

In some embodiments, a co-storage configuration may provide adequate particle seal for pressurized gas when discharging media to the pressurized fluidized bed heat exchanger. That is, a single silo 101 may contain solid particles at different temperatures. These solid particles may be referred to as "hot" solid particles and "cold" solid particles, meaning the "hot" solid particles have a significantly higher temperature than the "cold" solid particles. During the discharging mode, "hot" solid particles may flow into the fluidized bed heat exchanger by gravity and heat fluidizing gas and steam which can be used to generate electrical power. A well-insulated particle conveyor may then transport "cold" solid particles from the fluidized bed heat exchanger to the top of the silo where they may be released directly inside the silo (during the discharging mode) or to flow through a particle heater and then be released in the silo (during the charging mode). In addition to the primary silos, one or more spare silos may be used for maintenance or occasional operating needs.

The present disclosure may allow for direct heat transfer between the "hot" solid particles and a pressurized gas (i.e., the working fluid) in the fluidized bed heat exchanger at approximately 30 bars and a gas exit temperature of approximately 1170° C. The direct gas/particle contact may eliminate the cost and energy losses of heat exchange surfaces in indirect, traditional heat exchangers. Gas may exit the fluidized bed heat exchanger at the maximum particle temperature to drive the high-efficiency Brayton combined cycle power system. The closed-loop design may enable the use of an inert-gas working fluid such as nitrogen to avoid gas-piping oxidation. The fluidized bed heat exchanger may be an inert particle pressurized fluidized bed heat exchanger.

In some embodiments, the energy storage system may avoid energy loss by recycling hot outlet gas (i.e., working fluid), rather than expelling it as exhaust as in an open gas turbine combined cycle system. Brayton combined cycle efficiency may be optimized to maximize the power-system performance using system and component improvements. The pressure drops through the fluidized bed heat exchanger and gas/solid particle separation (cyclone separation) may be controlled to minimize energy losses in the individual turbines. Moreover, intercooling between the compressor stages may be incorporated and the turbine/steam generation split may be optimized to maximize the thermal-cycle efficiency. With a higher power-cycle efficiency and thermal energy storage energy density, the disclosed Brayton combined cycle system may offer advantages over steam Rankine and supercritical $CO_2$ (s-$CO_2$) cycles—the s-$CO_2$ power cycle has a narrow cycle temperature range, which limits the energy density due to a small temperature difference between the hot and cold storage media.

In some embodiments, the silo and insulation design for the particle storage system may contain particles at over 850-1300° C., and with less than 1% heat loss when operating at 1170° C. in a 10-hour storage period or less than 5% per week with the particle self-insulation effect. The disclosed energy storage system may require large particle quantities and container size which may impact containment structural design, installation materials, and construction methods. Concrete silos may be preferred for large-quantity storage of granular media such as coal ash and cement, which may amount to tens of thousands of tons.

In some embodiments, the fluidized bed heat exchanger may be constructed with a transparent material, such as glass, plexiglass, or transparent plastic. The purpose of the transparent fluidized bed heat exchanger may be to observe the particle flow and to verify the flow of particles from the fluidized bed heat exchanger to the TES silo for charging/discharging particles.

Figure 12:
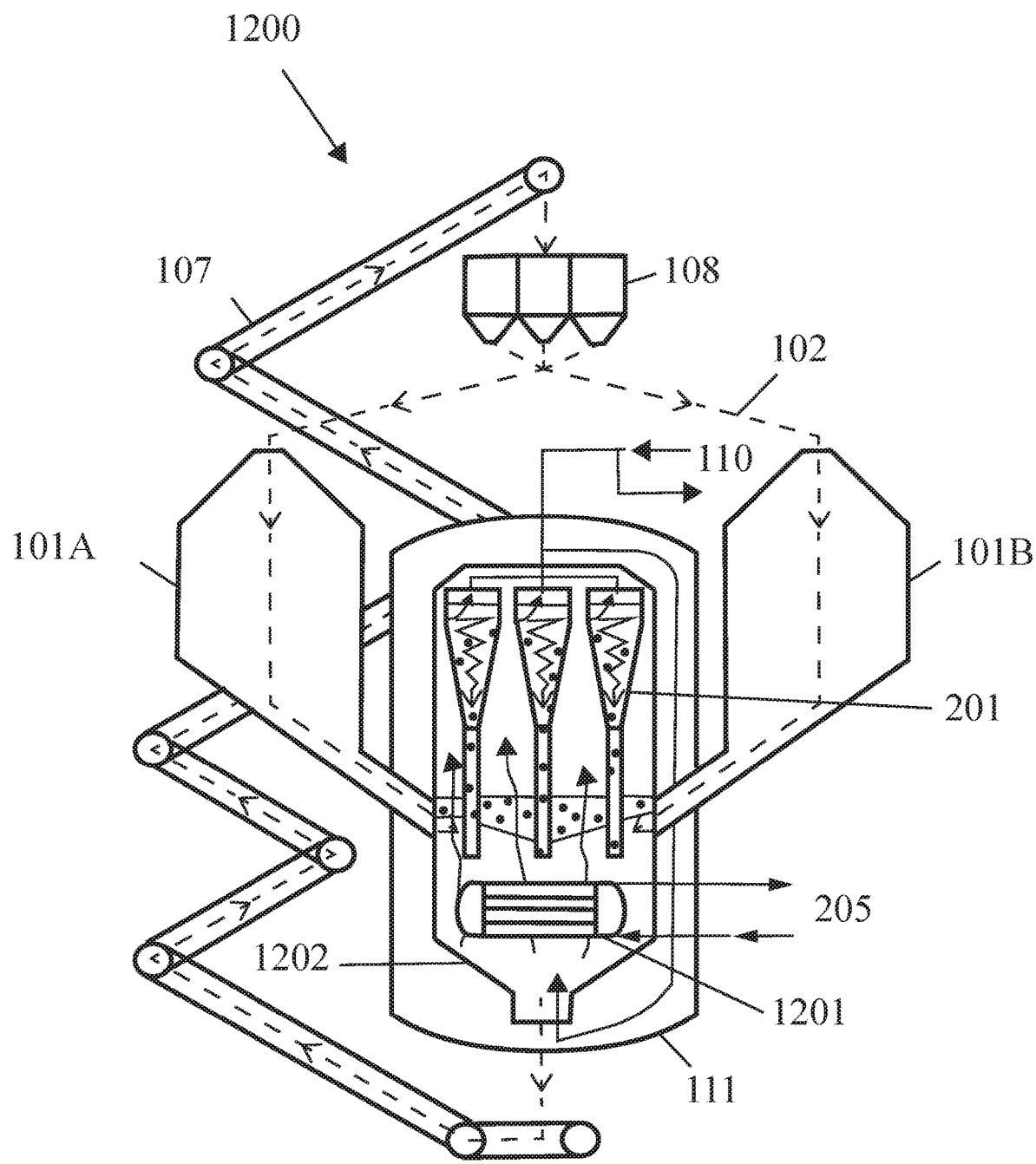
FIG. 12 illustrates a fluidized bed heat exchanger and the surrounding components of an energy storage system as described by some embodiments herein.

In some embodiments, the system may include a fluidized bed heat exchanger that is capable of heating pressurized gas to temperatures greater than 1150° C. to meet the Brayton combined-cycle power thermal load. The system may include a steam superheater and reheater and a particle conveyor, which may be internal or external to the silo. The fluidized bed heat exchanger may be designed for a low-profile arrangement of the vessel adjacent to the hot-particle silos and an increased operating temperature from 850° C. in commercial fluidized bed heat exchanger to 1170° C. in the energy storage system. A fluidized bed heat exchanger for inert particles may be significantly simpler than a traditional combustion pressurized fluidized bed heat exchanger. FIG. 12 shows the vessel may include an external, main pressure boundary shell that houses an inner casing with a gas gap between the two. Gas may be supplied by the Brayton combined cycle power compressors and may enter the pressurized vessel to maintain cool wall temperatures (typically less than 350° C.). This may allow for the use of low-cost steel. Gas may enter the fluidized bed through supply lines that may be connected to the distributors. The gas may flow through the particle bed and may enter a cyclone separator for particle control. The hot, clean gas may then enter the turbine. The system may include a connection between the pressurized fluidized bed heat exchanger and the thermal energy storage silo for charging and discharging particles, optimizing pressurized fluidization conditions, and gas clean-up.

FIG. 12 illustrates the components surrounding the fluidized bed heat exchanger 1200 of an energy storage system as described by some embodiments herein. The components surrounding the fluidized bed heat exchanger 1200 includes a particle heater 108, storage silos 101A-B, gas/particle separators 201, a steam/particle heat exchanger 1201, steam 205, a particle conveyor 107, solid particles 102, and a working fluid 110. The particles 102 may be stored in storage silos 101A-B after being heated in the particle heater 108. The fluidized bed heat exchanger 111 itself includes an external shell 111 and an inner casing 1202. The external shell 111 and inner casing 1202 are separated by a "gas gap," meaning a layer of working fluid 110 fills the space between the two layers. The working fluid 110 and steam 25 heat the solid particles 102; the working fluid 110 in the inner casing 1202 and gas/particle separator 201 and the steam 205 in the steam/particle heat exchanger 1201. Because the working fluid 110 is heating the solid particles 102 directly through particle/gas contact in the inner casing 1202 separating the two is required before the working fluid 110 can be routed through the rest of the energy storage system.

The working fluid 110 supplied by the Brayton combined cycle compressors, may enter the pressurized vessel to maintain cool wall temperatures (less than 350° C.). The walls may be made with steel. The working fluid may enter the fluidized bed through supply lines that are connected to the distributors. The working fluid may flow through the particle bed and enter a cyclone separator for particulate control. The hot, clean working fluid (in the form of a gas) may then enter a turbine. The fluidized bed heat exchanger may be connected with the TES silo for charging and discharging solid particles.

Ceramic tube, such as alumina or silicon carbide, may be used in the inner high-temperature fluidized bed heat exchanger. An electric coil may be wrapped around the ceramic tube to heat the fluidizing particles to the desired operating temperatures. Compressed air may be preheated before flowing through the bed for fluidization and exit the bed through a solid particle filter to the ambient. The fluidized bed heat exchanger pressure may be regulated by the air compressing pressure. A water flow loop may be embedded inside the fluidizing solid particles to measure the temperature change and to obtain an average particle heat transfer coefficient of fluidized bed heat exchanger. The measured heat transfer coefficient may be compared with literature data and numerical modeling results to guide the heat transfer area design of the product pressurized fluidized bed heat exchanger.

In some embodiments, the silos create a large storage capacity. A single silo may contain both hot solid particles (which may be storing energy) and cool solid particles. The hot solid particles and cool solid particles may be in separate layers within the same silo. There may be a temperature gradient between the hot solid particles and cool solid particles within the same silo. There may be hot solid particles and cold solid particles in the same silo with stratified layers, causing a thermal gradient across the insulation layer at the interface of the hot solid particles and cold solid particles. This co-storage configuration may significantly reduce containment cost while providing an adequate particle seal for pressurized gas when discharging the solid particles to the fluidized bed heat exchanger.

In some embodiments, the energy storage system may have multiple storage silos surrounding the fluidized bed heat exchanger. The solid particles may flow from the side into the fluidized bed heat exchanger. Lateral solid particle movement and a solid particle exit port may be coordinated for the even distribution of particles and gas heating. The gas/separation cyclones may be contained within the high-temperature inner vessel for a minimum pressure drop of the gas flow. The fluidized bed heat exchanger may be designed for a low-profile arrangement of the vessel adjacent to the hot-solid particle silos.

The present disclosure may be used in nuclear integration to store both heat and electricity. It may also be used for waste heat storage with electricity integration to store both heat and electricity.

The present disclosure utilizes stable, inexpensive particles at wide ranges of storage temperature (−200° C. to 1000° C.). Such temperatures present great challenges for liquid TES, as well as metal piping and containment.

Disclosed herein are methods for fluidized-bed operation at near-minimum fluidization velocity to optimize fluidized-bed performance for minimum parasitic power and heat loss and may include thermodynamic and techno-economic analysis to identify operating conditions for pressurized fluidized-bed heat exchanger and pumped particle thermal energy storage that provide improved performance and economics. The present disclosure may include the ratio between heat and electricity inputs and the hot-storage vs. cold-storage temperatures suited for storage efficiency and cycle electricity cost. The present disclosure may include high-temperature charging/discharging operating conditions for a power turbine and compressor, and may manage the necessary tradeoffs between pressure, pressure drop, and heat-transfer augmentation in the fluidized-bed heat exchanger. In some embodiments, the disclosed particle heat transfer may use hot fluids to heat particles as heat charging. In other embodiments, the disclosed particle heat transfer may use pre-heated hot particles to heat fluids as heat discharging. The present disclosure may include a system capable of adjusting based on operating conditions. In some embodiments, the charging and discharging may use the same pressurized fluidized-bed heat exchanger which would be located at the bottom of a particle-containment silo. In some embodiments, the hot-particle temperature may exceed the hot-particle transport capability, in which embodiment the particle-heating pressurized fluidized-bed heat exchanger may be placed on top of the hot storage, and a separate discharging fluidized-bed heat exchanger may be placed at the bottom of the hot storage.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an invention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

EXAMPLES

Example 1

A method comprising, in order:
a first storing of a first heat transfer medium comprising a first plurality of solid particles at a first temperature between 250 and 500° C.;
a first transferring of energy to the first heat transfer medium, resulting in at least a portion of the first heat transfer medium being heated to a second temperature between 850 and 1300 C;
a second storing of the heated first heat transfer medium at the second temperature;
a second transferring of at least a portion of the energy from first heat transfer medium at the second temperature to a working fluid at the first temperature, resulting in a heating of the working fluid to a third temperature between 700 and 1200° C. and a cooling of the first heat transfer medium to the first temperature; and
converting at least a fraction of the portion of energy to electricity.

Example 2

The method of Example 1, wherein the first storing, the first transferring, and the second storing occur within a silo.

Example 3

The method of Example 1, wherein the first transferring is performed using at least one of electrical energy, radiant energy, or thermal energy.

Example 4

The method of Example 3, wherein the first transferring is performed using a resistive heater powered by the electrical energy.

Example 5

The method of Example 1, wherein the first transferring is performed using a resistive heater positioned within a silo.

Example 6

The method of Example 3, wherein the first transferring of the radiant energy is performed using a receiver configured to receive solar radiation.

Example 7

The method of Example 1, wherein the second transferring occurs within a first heat exchanger.

Example 8

The method of Example 7, wherein the first heat exchanger comprises a fluidized bed.

Example 9

The method of Example 9, wherein the fluidized bed is pressurized to a pressure between 10 and 20 bars.

Example 10

The method of Example 8, wherein the working fluid fluidizes the first heat transfer medium.

Example 11

The method of Example 2, wherein the second transferring is completed within the silo.

Example 12

The method of Example 2, wherein the second transferring is completed using a heat exchanger positioned within the silo.

Example 13

The method of Example 1, wherein the converting comprises the expansion of the heated working fluid in a first turbine.

Example 14

The method of Example 1, wherein the first heat transfer medium comprises at least one of concrete, gravel, rock, ash, silica, alumina, titanium, clay, or any other suitable inorganic material.

Example 15

The method of Example 1, wherein the working fluid comprises at least one of air, nitrogen, carbon dioxide, or a noble gas.

Example 16

The method of Example 15, wherein the noble gas comprises at least one of neon, argon, krypton, or xenon.

Example 17

The method of Example 13, further comprising:
prior to the first transferring, operating the turbine as compressor, by providing electrical energy to the turbine, wherein:
the operating transfers a least a portion of the electrical energy to the working fluid at the first temperature, resulting in the heating of the working fluid to the third temperature.

Example 18

The method of Example 17, further comprising:
prior to the first transferring, a third transferring of energy from the working fluid at the third temperature to the first heat transfer medium at the first temperature, resulting in a heating of the first heat transfer medium to a fourth temperature that is between the first temperature and the second temperature, wherein:
subsequently, the first transferring results in the heating of the first heat transfer medium from the fourth temperature to the second temperature.

Example 19

The method of Example 1, further comprising:
after the second transferring, a fourth transferring of energy from the first heat transfer medium at the fourth temperature to a second heat transfer medium at a fifth temperature between −80 and −10° C., wherein:
the fourth transferring results in the cooling of the first heat transfer medium to a sixth temperature between 150 and 300° C., and
the heating of the second heat transfer medium a seventh temperature between −10 and 20° C.

Example 20

The method of Example 19, further comprising:
passing the working fluid at the fourth temperature through a second turbine, wherein: the second turbine results in the producing of electricity.

Example 21

The method of Example 19, wherein the working fluid comprises at least one of an organic material or water.

Example 22

The method of Example 1, further comprising:
a second heat transfer medium comprising a second plurality of solid particles at the seventh temperature and
before the second transferring, a fifth transferring of energy from the second heat transfer medium to the working fluid, wherein:
the fifth transferring results in the cooling of the second heat transfer medium to the fifth temperature and the heating of the working fluid to the third temperature.

Example 23

A system comprising:
a first heat transfer medium;
a first working fluid;
a first heat exchanger; and
a second heat exchanger; wherein:
the first heat transfer medium comprises a plurality of solid particles,
the first heat transfer medium is capable of being heated by the first heat exchanger from a first temperature between 250 and 500° C. and a second temperature between 850° C. and 1300° C.,
a first conduit is configured to transfer the first heat transfer medium from the first heat exchanger to the second heat exchanger, and
the second heat exchanger is configured to transfer heat from the first heat transfer medium at the second temperature to the first working fluid at the first temperature, resulting in the cooling of the first heat transfer medium from the second temperature to the first temperature and the heating of the first working fluid from the first temperature to a third temperature between 700 and 1200° C.

Example 24

The system of Example 23, wherein the first heat transfer medium comprises at least one of concrete, gravel, rock, ash, silica, alumina, titanium, clay, or any other suitable inorganic material.

Example 25

The system of Example 24, wherein the first working fluid comprises at least one of air, nitrogen, carbon dioxide, or a noble gas.

Example 26

The system of Example 25, wherein the noble gas comprises at least one of neon, argon, krypton, or xenon.

Example 27

The system of Example 23, wherein the first heat exchanger is configured to transfer at least one of electrical energy, radiant energy, or thermal energy to the first heat transfer medium.

Example 28

The system of Example 27, wherein the first heat exchanger comprises a resistive heater powered by electrical energy.

Example 29

The system of Example 27, wherein the first heat exchanger is configured to receive the radiant energy in the form of solar radiation.

Example 30

The system of Example 23, wherein the first heat transfer medium is stored in a silo.

Example 31

The system of Example 29, wherein the first heat exchanger is positioned within the silo.

Example 32

The system of Example 23, wherein the second heat exchanger comprises a fluidized bed.

Example 33

The system of Example 32, wherein the fluidized bed is capable of being pressurized to a pressure between 10 and 20 bar.

Example 34

The system of Example 32, wherein the second heat exchanger is positioned within the silo.

Example 35

The system of claim 10, wherein the first working fluid fluidizes the first heat transfer medium.

Example 36

The system of Example 23, further comprising:
a first turbine; and
a shaft; wherein:
the first working fluid at the third temperature is expanded through the first turbine, resulting in the first working fluid at the first temperature and the generation of electricity by the rotation of the shaft.

Example 37

The system of Example 36, wherein:
the first turbine may be operated as a compressor and may compress the first working fluid from the first temperature to the third temperature.

Example 38

The system of Example 23, further comprising:
a second heat transfer medium; and
a third heat exchanger; wherein:
the second heat transfer medium is capable of being cooled by the first working fluid from a fourth temperature between −10 and 20° C. to a fifth temperature between −80 and −10° C. in the third heat exchanger, and
the third heat exchanger is configured to transfer heat from the first working fluid to the second heat transfer medium, resulting in a heated second heat transfer medium at the fourth temperature.

Example 39

The system of Example 38, wherein the first working fluid transfers heat from the first heat transfer medium at the second temperature to the second heat transfer medium at the fifth temperature, resulting in the first heat transfer medium at a sixth temperature between 150 and 300° C. and the second heat transfer medium at the fourth temperature.

Example 40

The system of Example 38 wherein the second heat exchanger and the third heat exchanger are fluidized bed heat exchangers.

The invention claimed is:

1. A system comprising:
a first heat transfer medium;
a first working fluid;
a first heat exchanger;
a second heat exchanger;
a first turbine; and
a shaft wherein:
the first heat transfer medium comprises a plurality of solid particles,
the first heat transfer medium is capable of being heated by the first heat exchanger from a first temperature between 250 and 500° C. and a second temperature between 850° C. and 1300° C.,
a first conduit is configured to transfer the first heat transfer medium from the first heat exchanger to the second heat exchanger,
the second heat exchanger is configured to transfer heat from the first heat transfer medium at the second temperature to the first working fluid at the first temperature, resulting in the cooling of the first heat transfer medium from the second temperature to the first temperature and the heating of the first working fluid from the first temperature to a third temperature between 700 and 1200° C.,
the first working fluid at the third temperature is expanded through the first turbine, resulting in the first working fluid at the first temperature and the generation of electricity by the rotation of the shaft, and
the first turbine may be operated as a compressor and may compress the first working fluid from the first temperature to the third temperature.

2. The system of claim 1, wherein the second heat exchanger comprises a fluidized bed.

3. The system of claim 1, further comprising:
a second heat transfer medium; and
a third heat exchanger; wherein:
the second heat transfer medium is capable of being cooled by the first working fluid from a fourth temperature between −10 and 20° C. to a fifth temperature between −80 and −10° C. in the third heat exchanger, and
the third heat exchanger is configured to transfer heat from the first working fluid to the second heat transfer medium, resulting in a heated second heat transfer medium at the fourth temperature.

4. The system of claim 3, wherein the first working fluid transfers heat from the first heat transfer medium at the second temperature to the second heat transfer medium at the fifth temperature, resulting in the first heat transfer medium at a sixth temperature between 150 and 300° C. and the second heat transfer medium at the fourth temperature.

5. The system of claim 3, wherein the second heat exchanger and the third heat exchanger are fluidized bed heat exchangers.

* * * * *